United States Patent [19]

Sukman et al.

[11] 3,970,598

[45] July 20, 1976

[54] FLAME RETARDANT COMPOSITIONS DERIVED FROM DIFUNCTIONAL CARBOXYLIC ACIDS CONTAINING A HALOGENATED THIOPHERE RING AND METHODS FOR THEIR PREPARATION

[75] Inventors: Edwin L. Sukman, Fanwood; Irving Touval, Edison, both of N.J.

[73] Assignee: M & T Chemicals Inc., Greenwich, Conn.

[22] Filed: July 29, 1974

[21] Appl. No.: 492,759

Related U.S. Application Data

[63] Continuation-in-part of Ser. No. 316,706, Dec. 20, 1972, abandoned, which is a continuation-in-part of Ser. No. 192,562, Oct. 26, 1971, abandoned.

[52] U.S. Cl. .............................. 260/75 S; 260/75 H; 260/873
[51] Int. Cl.² ........................................ C08G 63/12
[58] Field of Search ............... 260/75 H, 75 S, 873, 260/332.2 C, 47 R, 47 UA

[56] References Cited
UNITED STATES PATENTS

| | | | |
|---|---|---|---|
| 2,744,917 | 5/1956 | Jones et al. | 260/332.2 C |
| 3,336,264 | 8/1967 | Hartmann et al. | 260/75 S |
| 3,462,391 | 8/1969 | Stewart | 260/75 S X |
| 3,664,986 | 5/1972 | MacDonald | 260/75 H X |

*Primary Examiner*—Lucille M. Phynes
*Attorney, Agent, or Firm*—Robert P. Auber; Kenneth G. Wheeless; Robert Spector

[57] ABSTRACT

Flame retardant synthetic polyesters contain repeating units or side chains derived from mono- or dihalogenated dicarboxylic acids wherein the carboxylic acid groups are bonded directly to different carbon atoms of a thiophene ring structure.

5 Claims, No Drawings

FLAME RETARDANT COMPOSITIONS DERIVED FROM DIFUNCTIONAL CARBOXYLIC ACIDS CONTAINING A HALOGENATED THIOPHERE RING AND METHODS FOR THEIR PREPARATION

BACKGROUND

This application is a continuation-in-part of abandoned application Ser. No. 316,706 filed Dec. 20, 1972, which in turn is a continuation-in-part of application Ser. No. 192,562 filed Oct. 26, 1971 and now abandoned.

This invention relates to novel copolymerizable flame retardants and to polyesters wherein at least a portion of the repeating units are derived from difunctional carboxylic acids containing a halogenated thiophene ring structure. This invention further relates to flame retardant polyesters and resins which exhibit excellent clarity, color and stability in those applications where the bulk polymer, the final product, or both are exposed to elevated temperatures.

With the increasing use of saturated and unsaturated polyesters, as in the fiber industry for example, the flame retardant characteristics of these materials have become increasingly important. In the face of increasingly strict governmental regulations, efforts are being made to develop flame retardant additives for polymers and resins which will improve their flame retardant characteristics without adversely affecting other desirable properties of the final composition, such as by imparting unwanted color to the polymer or, even more importantly, degrading the mechanical characteristics of the polymer so as to decrease its effectiveness for a given end use.

In addition to good performance, the cost of the flame retardant is an important consideration for commercial processes wherein thousands of pounds of polymer are produced.

A variety of antimony compounds, e.g., antimony trioxide, in combination with a halogen source, e.g., a halogenated hydrocarbon, impart flame retardancy to many polymer compositions without interfering with their stability either in the environment in which they are to be used or during their preparation. A major shortcoming of antimony compounds is their adverse effect on the tensile properties of polymeric materials when the compounds are employed at concentration levels required to attain an adequate degree of flame retardancy.

Many otherwise useful flame retardants are sufficiently volatile and/or unstable that a substantial portion is lost at the elevated temperatures encountered during formulating and shaping of polyester compositions, many of which are processed at temperatures above about 250°C.

It is well known that flame retardant properties can be imparted to polyesters by employing one or more halogenated di- or polyfunctional compounds as comonomers. Useful comonomers include halogen-containing diols and/or dicarboxylic acids which contain aliphatic, cycloaliphatic, or aromatic hydrocarbon structures. The aliphatic compounds are relatively unstable, with the result that some halogen is evolved during processing of the polymer, which may impart an undesirable coloration to the final product.

Chlorinated compounds, as a class, are less than satisfactory because of the high concentration of these compounds required to obtain effective amounts of free chlorine at flame temperature.

Monomers wherein the bromine is bonded to an aliphatic or cycloaliphatic hydrocarbon radical are considerably less stable than the corresponding chlorinated derivatives. A portion of the available bromine is often liberated during processing of the polymer, resulting in discoloration of the final product. At the other extreme, the bond between bromine and an aromatic hydrocarbon radical is so strong that only a relatively small portion of the total available bromine is evolved even at flame temperatures. Inordinately high concentrations of these compounds are therefore required to obtain adequate flame retardancy.

One objective of this invention is to provide effective flame retardants that can be incorporated into the backbone structure or side chains of saturated and unsaturated polyesters.

A second objective is to provide a class of flame retardants which are stable at temperatures encountered during processing of polyesters, yet which decompose readily at flame temperatures to liberate an effective amount of bromine or chlorine.

It is also an objective of this invention to provide flame retardants which do not adversely affect the physical properties of a polyester.

It has now been found that acceptable to excellent flame-retardant properties can be imparted to synthetic polyesters by incorporating into the structure of the polymer an effective amount of a halogenated thiophene mono- or dicarboxylic acid. The resultant polyesters can be employed as flame retardants for normally flammable polymers.

STATEMENT OF THE INVENTION

This invention concerns novel flame retardant polyesters containing repeating units selected from the group consisting of:

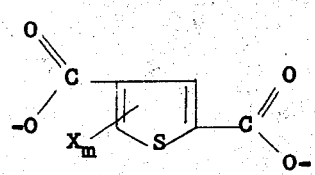,

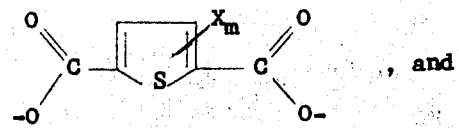, and

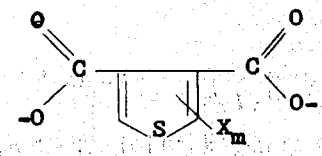

wherein X represents a chlorine or bromine atom and $m$ represents the integer 1 or 2.

For brominated derivatives of the present thiophene dicarboxylic acids, an effective concentration of acid is equivalent to between about 6 and 15% bromine, based on polymer weight, which corresponds to between about 12 and 30% by weight of a dibrominated thiophene dicarboxylic acid.

Adequate flame retardance is obtained with greater than 12 and up to about 20% by weight of chlorine, based on the dichlorinated thiophene dicarboxylic acid. Since flame retardancy appears to be directly related to halogen concentration, it is evident that a proportionately larger concentration of flame retardant is requiring using mono-halogenated thiophene dicarboxylic acids.

DETAILED DESCRIPTION OF THE INVENTION

The flame-retardant polyesters of this invention are derived, at least in part, from mono- or dihalogenated thiophene dicarboxylic acids. The dicarboxylic acids exhibit one or more of the following formulae

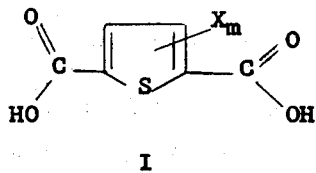

I

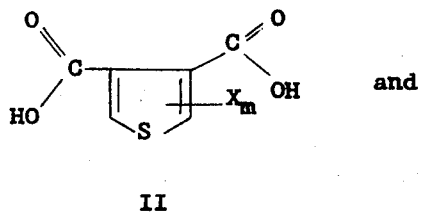

and

II

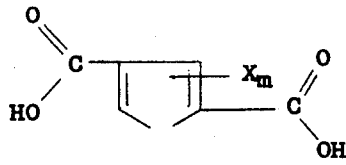

III wherein X represents a chlorine or bromine atom, and m represents the integer 1 or 2.

PREPARATION OF HALOGENATED THIOPHENE DICARBOXYLIC ACIDS

Halogenated 2, 5-thiophene dicarboxylic acids corresponding to formula I hereinabove are conveniently prepared by reacting the corresponding 2,3,4,5-tetrahalo- or 2,3,5-trihalothiophene (prepared by the halogenation of thiophene) with a stoichiometric amount or a slight excess of organolithium compound at low temperatures and in the presence of a cyclic or linear ether as the diluent. The resultant organolithium derivative is then reacted with carbon dioxide using procedures described in the prior art.

The reaction is believed to follow the course outlined below for the tetrabrominated derivative:

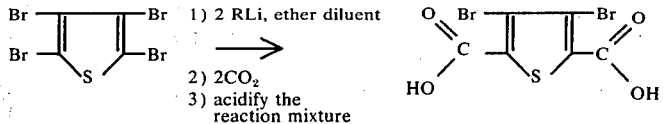

Thiophene-3, 4-dicarboxylic acids can be prepared as described in U.S. Pat. No. 2,744,917 from the corresponding formyl succinate and phosphorus pentasulfide, followed by hydrolysis of the resultant ester.

A method for preparing thiophene-2, 4-dinitrile is described in U.S. Pat. No. 3,162,650. The nitrile is readily hydrolyzed to the corresponding acid using known procedures.

INCORPORATION OF HALOGENATED THIOPHENE DICARBOXYLIC ACIDS INTO POLYMERS

The dicarboxylic acids of this invention can be incorporated into the structure of synthetic polyesters derived from dicarboxylic acids and either diols or dihydric phenols.

Polyesters are prepared by reacting one or more aliphatic or aromatic dicarboxylic acids or suitable derivatives thereof, such as anhydrides or esters of the acids prepared using volatile monohydric alcohols containing between 1 and 5 carbon atoms, with one or more alkyl, aralkyl or cycloalkyl diols containing between 2 and 12 carbon atoms. Suitable acids contain between 2 and 18 carbon atoms and include oxalic, malic, maleic, butanedioic, hexanedioic, octanedioic, and the isomeric cyclohexanedioic acids, the three isomeric phthalic acids, trimellitic acid, and the isomeric naphthalene dicarboxylic acids. Suitable diols include ethylene glycol, propylene glycol, 1, 4-butanediol, 1, 6-hexanediol and the isomeric cyclohexanediols. A di- or bis- phenol can be substituted for all or a portion of the glycol. If a cross-linked polymer is desired, one or more compounds containing three or more acid or hydroxyl groups is employed in place of a portion of one of the corresponding difunctional reagents.

Polyesters are also prepared from a hydroxyacid or the corresponding cyclic lactone.

While it is possible to prepare saturated polyesters of relatively low molecular weight by a direct esterification reaction between the free acid and a diol, it is usually preferable to obtain the polymer by a transesterification reaction between the diol and an ester derived from the desired dicarboxylic acid and a relatively low boiling monohydric alcohol containing between 1 and 4 carbon atoms. Methyl esters are usually employed for this purpose. A mixture of dicarboxylic acid esters, including one or more derived from the present thiophene dicarboxylic acids, are reacted with one or more diols at a temperature between 150° and about 200°C. under an inert atmosphere. For the lower boiling glycols, such as ethylene glycol, it is desirable to employ a considerable excess of the glycol, for example 2.2 moles of glycol per mole of dicarboxylic acid ester. The resultant bis(hydroxyalkyl) ester is polymerized at temperatures between 200° and 250°C. The pressure in the reaction vessel is gradually reduced, usually to less than 1 mm. of mercury, as the excess glycol is distilled. The partial vacuum is maintained until the polyester attains the desired molecular weight.

A variety of well known catalysts are usually employed for both the ester interchange and polycondensation reactions. Suitable ester interchange catalysts include weak bases such as the carbonates, alkanoates, hydrides and alkoxides of sodium, lithium, zinc, magnesium and titanium. Catalysts for the polycondensation reaction of the bis(hydroxyalkyl) ester include antimony trioxide and the titanates such as tetraisopropyl titanate.

Unsaturated polyester resins are generally of relatively low molecular weight prior to curing. These polymers are prepared from a saturated acid, such as one of the isomeric phthalic acids or adipic acid, an unsaturated acid, such as maleic or fumaric acid, and a glycol using procedures described hereinbefore. One of the present thiophene dicarboxylic acids is included in the reaction mixture. The resin is crosslinked by reacting the double bonds of the unsaturated acid residue with a vinyl monomer, usually styrene, in the presence of a free radical source such as an organic peroxide.

The relative concentration of unsaturated acid residues in the polymer chains is based on the degree of crosslinking desired, which is, in turn, determined by the physical properties to be exhibited by the cured resin.

Procedures for compounding and curing the unsaturated polyester resins in the presence of free radical sources are well known in the art. The conventional methods should not require significant modification due to the presence of a halogenated thiophene dicarboxylic acid residue in the resin. The mixture of polyester vinyl monomer and free radical source is formed into the desired shape or coated on a substrate. Some free radical sources will initiate polymerization, or cross-linking, of the resin at ambient temperature while others must be heated slightly. The concentration of free radical source is usually between 0.5 and 20%, based on the weight of the resin. The rate of cure can be varied by the use of appropriate accelerators and inhibitors that are well known in the art.

Curing unsaturated polyesters is an exothermic reaction. If it is desired to reduce the peak temperature reached during the exotherm this can be achieved by using appropriate inhibitors, which also increase cure time, or by using α-methylstyrene, which is an effective exotherm depressant yet does not significantly increase the cure time or adversely affect the physical properties of the cured resin.

The novel compounds of this invention can also be reacted with preformed polyesters that contain free hydroxyl radicals or other radicals which will react with carboxylic acids. These radicals are introduced by use of a stoichiometric excess of glycol or by employing trifunctional hydroxy compounds, such as glycerol, as one of the alcohol components and adjusting the stoichiometry such that the final polyester contains 2 moles of carboxyl radicals for every three moles of trifunctional alcohol. This will prevent or minimize crosslinking.

Detailed procedures for preparing representative saturated and unsaturated polyesters are contained in a text entitled "Preparative Methods of Polymer Chemistry" by W. R. Sorenson and T. W. Campbell, published by Interscience Publishers (New York, 1961). The chlorinated or brominated thiophene dicarboxylic acids of this invention can be incorporated into the polyester using the procedures of Sorenson and Campbell, substituting one or more acids of this invention for a portion or all of the specified saturated or aromatic dicarboxylic acids. Little if any variation from the disclosed reaction conditions should be required. For a solution polymerization it may be necessary to find a solvent or mixture of solvents that dissolves all of the monomers.

Polymers containing the halogenated thiophene carboxylic acids of this invention can be processed at temperatures above 180°C. without undergoing significant discoloration. By comparison, a polyester prepared using tetrabromophthalic anhydride, a commercial flame retardant, at an equal bromine concentration, is appreciably discolored (Gardner color number of about 7) following a short exposure to a temperature of about 190°C.

The minimum concentration of repeating units or side chains derived from the halogen-containing thiophene dicarboxylic acids of this invention required to impart useful levels of flame retardancy to a given polymer composition is most conveniently expressed in terms of the percent by weight of halogen (either bromine or chlorine) present for a given weight of polyester, which is in turn a function of the particular polymer being flame retarded. These values are well known in the art, and are relatively constant regardless of the source of the halogen, i.e., whether it be the compounds of this invention, a low molecular weight halogenated hydrocarbon or an inorganic halide. Polyesters usually require at least 6% by weight of bromine or 12% of chlorine to exhibit an acceptable level of flame retardancy. The foregoing minimum concentrations of halogen can often be reduced up to 50% by the addition of known synergists such as antimony oxide or other antimony compounds. It will be understood that the degree of flame retardancy imparted to a given polymer is in most instances directly proportional to the concentration of halogen available at flame temperatures. Incorporating more than about 50% by weight of the compounds of this invention into a polymer is usually undesirable because the cost of the thiophene dicarboxylic acid may be considerably higher than that of the other monomers. In addition, the presence of the thiophene-based dicarboxylic acid in excessive amounts may adversely affect the physical properties of the polyester.

METHODS FOR MEASURING FLAME RETARDANCY

The Limiting Oxygen Index (L.O.I.) value provides a useful criterion for determining the flammability of various materials. The method employed to determine this value for polymer samples is described in ASTM Test Method No. D-2863-70. The test samples are placed in a vertically oriented Pyrex glass tube, approximately 3.5 inches (8.9 centimeters) in diameter and 17.7 inches (45.0 centimeters) in height, which has a bed of glass beads disposed at the bottom thereof and a holder located about 6 inches (15 cm.) above the glass beads, by means of which the samples are maintained in a vertical position. The gas is introduced at the bottom of the tube by allowing it to diffuse through the glass beads. The gas is pure nitrogen, pure oxygen, or a specified mixture of the two. The flow of gas is controlled and monitored by means of suitable valves and flow meters. Once the desired gas atmosphere has been established in the tube, a flame is touched to the test sample and the minimum oxygen concentration required to support combustion is noted. The limiting oxygen index is then calculated using the following formula:

$$\text{Limiting Oxygen Index} = \text{LOI} = \frac{[O_2] \times 100}{[O_2] + [N_2]}$$

wherein $[O_2]$ represents the minimum oxygen concentration required to support combustion and $[N_2]$ represents the corresponding concentration of nitrogen.

Specimens exhibiting a limiting oxygen index value less than 21.0 will burn readily in air while a limiting oxygen index greater than 21.0 indicates that the sample will burn sluggishly, if at all, in ambient air.

The following examples represent preferred embodiments of this invention and should not be interpreted as limiting the scope thereof.

EXAMPLE 1

Preparation of 3,4-dibromo-2,5-thiophene dicarboxylic acid.

Into a reaction vessel equipped with a mechanically driven agitator, water cooled reflux condenser, nitrogen inlet, and addition funnel were placed 775 g. (1.94 moles) of 2,3,4,5-tetrabromothiophene and 2.5 liters of anhydrous diethyl ether. The resultant suspension was stirred and cooled to 0°C., at which time 2 moles of butyl lithium (as a 22% by weight solution in hexane) were added over a period of about 0.5 hour while maintaining the cooled reaction mixture under a nitrogen atmosphere. Following completion of the addition, the reaction mixture was poured into a vessel containing a large stoichiometric excess of dry ice (solid carbon dioxide), and allowed to warm to ambient temperature. An excess of water was added, followed by sufficient aqueous hydrochloric acid to completely precipitate the free acid. The crude acid was purified by dissolving it in an aqueous solution of sodium hydroxide, treating the resultant solution with activated charcoal and acidifying the liquid phase using sulfuric acid (about 95% $H_2SO_4$).

The dried solid product weighed 627 g. (99% yield) and did not melt below 300°C. Elemental analysis yielded the following results, expressed as weight percent:

|  | FOUND | CALCULATED |
|---|---|---|
| Bromine | 47.5 | 48.8 |
| Sulfur | 9.45 | 9.7 |

The neutralization equivalent, i.e., the equivalent weight of the acid, was 166. The theoretical value for the diacid is 165.

EXAMPLE 2

Preparation of a Polyester Using 3,4-dibromo-2,5-thiophene Dicarboxylic Acid

An unsaturated polyester was prepared by combining 140 g. (0.42 mole) of 3,4-dibromo-2,5-thiophene dicarboxylic acid with 105 g. (1.4 mole) of propylene glycol and 82.5 g. (0.85 mole) of maleic anhydride in a reactor equipped with a mechanically driven agitator, water cooled reflux condenser, nitrogen inlet, and a trap for removing liquid returning from the reflux condenser. The reaction mixture was heated to a temperature between 100°–200°C. for about 3 hours, at which time evolution of water, a by-product of the reaction, was no longer observed. The acid number of the polymer was 40. The reaction mixture was then cooled to a temperature of 120°C., at which time 0.1 g. of hydroquinone and 120 g. (1.15 mole) of styrene were added. The mixture was cooled to 50°C. with stirring to obtain a homogeneous solution.

100 grams of the resultant polymer was cured by adding 1 g. of a 60% (by weight) solution of methyl ethyl ketone hydroperoxide in dimethyl phthalate and 0.4 g. of a 6% by weight solution of cobalt naphthenate (based on cobalt) in a liquid hydrocarbon.

The final polymer exhibited a Limiting Oxygen Index (L.O.I.) value of 23.9.

A second polymer prepared as described in this example, with the exception that the 3,4-dibromo-2,5-thiophene dicarboxylic acid was replaced by an equimolar amount of maleic anhydride, exhibited an L.O.I. value of 19.0, indicating that it burns readily in air.

EXAMPLE 3

This example demonstrates the preparation of a saturated polyester using one of the present flame retardants.

A mixture containing 25 g. of 3,4-dibromo-2,5-thiophene dicarboxylic acid, 23.9 g. of ethylene glycol and 0.0012 g. of zinc diethoxide was heated for 30 minutes with stirring at 160°C. under a nitrogen atmosphere. A 0.0065 g. portion of sodium silicate nonahydrate was added and heating continued for an additional 30 minutes, at which time 0.013 g. of antimony tris-butoxide was added. The pressure within the reaction vessel was then gradually reduced. Ethylene glycol distilled and was collected over a period of about 2.5 hours, at which time the temperature of the reaction mixture was increased to 220°C. and maintained for 1.5 hours. A brown, brittle polymer was obtained upon cooling of the reaction mixture. The polymer was soluble in hot o-dichlorobenzene or N,N-dimethylformamide and precipitated upon cooling of the solution.

Although this invention has been disclosed by reference to specific examples, it will be apparent to those skilled in the art that various modifications and changes may be made thereto which fall within the scope of this invention.

What is claimed is:

1. A flame-retardant synthetic polyester wherein a portion of said polyester consists of repeating units selected from the group consisting of

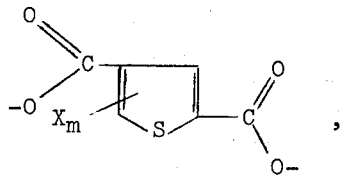

, and

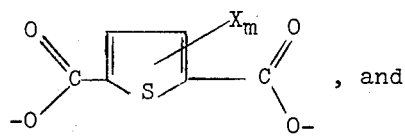

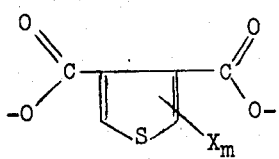

wherein X represents a bromine or chlorine atom and m is the integer 1 or 2, the concentration of said repeating units being equivalent to between 6 and about 15% of said X radical, based on the weight of polyester, when X represents bromine or between 12 and about 20% of said X radical when X represents chlorine, the remaining repeating units being selected from the group consisting of
  a. residues of aliphatic and aromatic dicarboxylic acids containing between 2 and 18 carbon atoms, and
  b. residues of alkyl, aralkyl and cycloalkyl diols containing between 2 and 12 carbon atoms, wherein said polyester contains at least one member from each of said groups (a) and (b).

2. The flame-retardant polymer of claim 1 wherein the polymer is an unsaturated polyester.

3. The flame-retardant polymer of claim 1 wherein X represents a bromine atom, and $m$ is 2.

4. A flame-retardant polyester containing a multiplicity of pendant groups bonded to the polymer backbone wherein at least a portion of said pendant groups terminate in a radical of the general formula

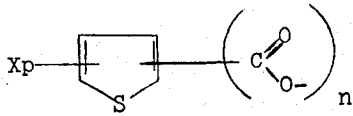

wherein X represents a bromine or a chlorine atom, $n$ is 1 or 2 and $p$ is the integer 1, 2, or 3, and wherein the backbone of the polyester consists essentially entirely of repeating units selected from the group consisting of
  a. residues of aliphatic and aromatic dicarboxylic acids containing between 2 and 18 carbon atoms,
  b. residues of alkyl, aralkyl and cycloalkyl diols, wherein a portion of said residues contain said pendant groups, and wherein said backbone contains at least one member selected from each of said groups (a) and (b).

5. The flame-retardant polyester of claim 4 wherein the concentration of said pendant groups is equivalent to between 6 and about 15% of said X radical, based on the weight of said polyester, when X represents bromine or between 12 and 20% of said X radical when X represents chlorine.

* * * * *